United States Patent [19]

Solia

[11] Patent Number: 4,922,844
[45] Date of Patent: May 8, 1990

[54] SAILING-BOAT HULL

[75] Inventor: Franco Solia, Milan, Italy

[73] Assignee: AKZO S.r.l., Milan, Italy

[21] Appl. No.: 214,065

[22] Filed: Jul. 1, 1988

[30] Foreign Application Priority Data

Jul. 1, 1987 [IT] Italy ............................... 53489/87[U]

[51] Int. Cl.⁵ ........................................... B63H 25/38
[52] U.S. Cl. ..................................... 114/39.1; 114/62
[58] Field of Search .................... 114/39.1, 62, 56, 61, 114/140, 162, 163

[56] References Cited

U.S. PATENT DOCUMENTS 2,371,478  3/1945  Steele ..................................... 114/62

FOREIGN PATENT DOCUMENTS 2338179  9/1977  France ................................ 114/140
2120192 11/1983  United Kingdom .................. 114/62

*Primary Examiner*—Joseph F. Peters, Jr.
*Assistant Examiner*—Edwin L. Swinehart
*Attorney, Agent, or Firm*—Sughrue, Mion, Zinn, Macpeak & Seas

[57] ABSTRACT

A sailing-boat hull includes a bottom (C) provided with a projecting keel (12) of U-shaped cross-section which is connected laterally to the sides (F) by two longitudinal channels (14) of rounded section so as to define, with the sides (F), two longitudinal side portions (16) of rounded section extending substantially the entire length of the hull. The rounded side portions (16) of the bottom (C) are situated at a higher level than the keel (12).

2 Claims, 3 Drawing Sheets

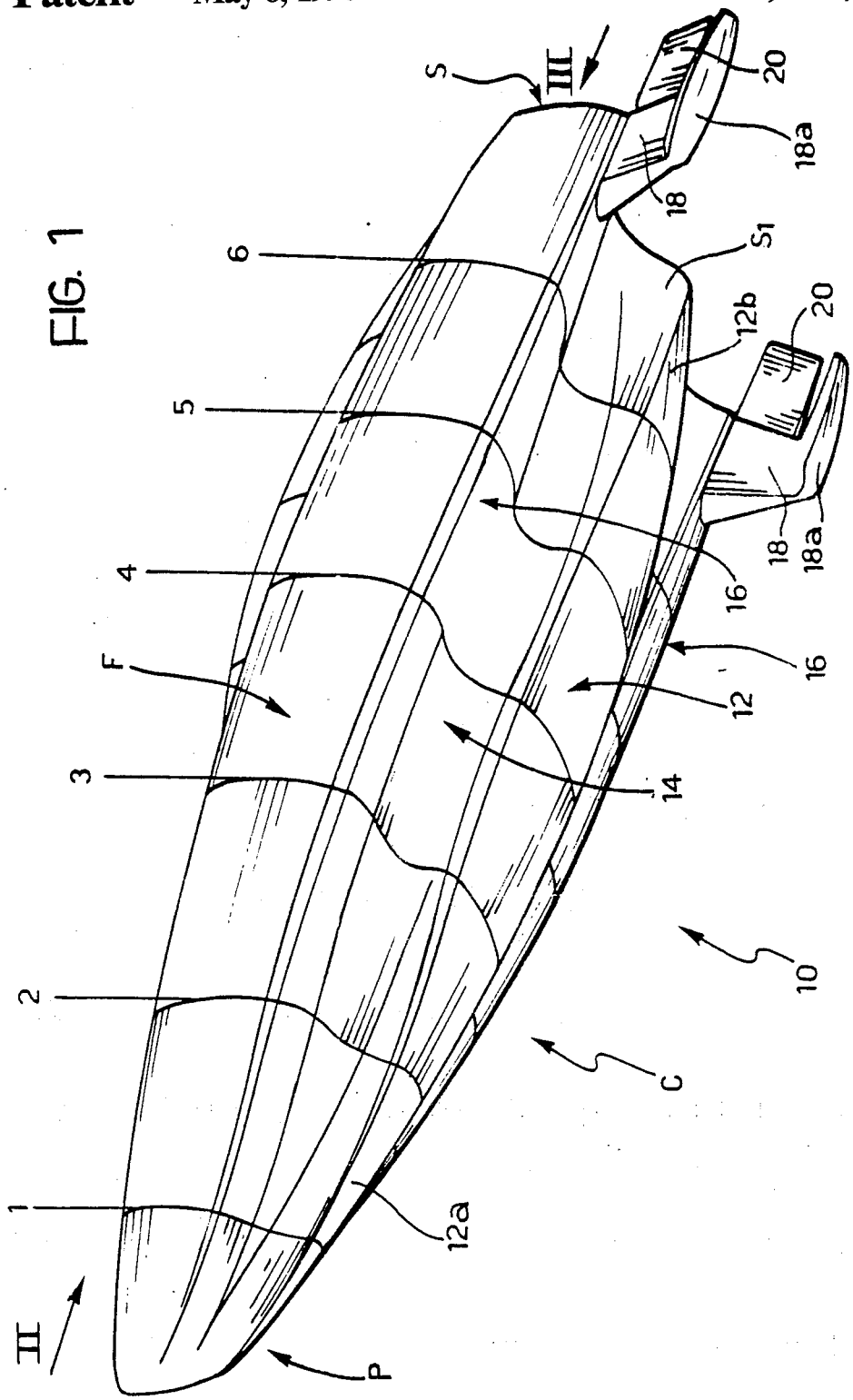

SAILING-BOAT HULL

BACKGROUND OF THE INVENTION

The present invention relates to a sailing-boat hull.

In conventional sailing-boat hulls, it is often difficult to reconcile various requirements, such as the rigidity of the structure, the habitability of the interior, low freeboard, a steady helm, transverse stability, etc. with each other in a product which satisfies these requirements in a well-balanced manner and also enables a hull to be produced which is fast and able to make the best use of the wind force acting on the sail area in all conditions.

SUMMARY OF THE INVENTION

The object of the present invention is to provide a hull which, as well as optimising the above requirements, enables a particularly fast and stable craft to be produced.

According to the invention, this object is achieved by virtue of the fact that the hull has a bottom which is provided with a projecting keel having a substantially U-shaped cross-section with tapered ends connected to the stern and bow regions of the hull respectively, and which is connected to the sides by means of two longitudinal channels of rounded section connected the keel in the bow region so as to define two longitudinal side portions of the bottom which have rounded sections, are situated at a higher level than the keel and extend from the stern for a substantial length of the bottom.

By virtue of these characteristics, the structure of the hull is particularly rigid both in bending and in torsion and does not need special ribbing or bulkheads. The particular shape of the bottom enables it to have a reduced freeboard and consequently reduced passive wind resistance, whilst the habitability of the interior and the headroom are kept unaltered.

Another advantage of the hull according to the invention concerns the small draft and high transverse stability of the hull, which enables lighter ballast to be used. In fact, the particular U-shape of the keel enables the loads to be concentrated in a more central and lower position than is possible in conventional hulls, thus enabling the ballast to be reduced by up to 50% compared with conventional hulls with the same displacement.

A further important advantage concerns the high speed which can be reached by the hull, particularly at planing speeds. In particular, the shape of the keel with a substantially flat bottom enables the vertical hydrodynamic force to be used to lift the two longitudinal side portions of the bottom from the surface of the water with a drastic reduction in the wetted area. At planing speeds therefore, maximum speeds considerably higher than those attainable by conventional hulls of the same waterline length can be reached.

The increase in speed compared with conventional hulls is not only found at planing speeds, since the hull according to the invention enables the attainment of speeds which are greater than the limit defined by the known formula whose key parameter is the value of the length of the hull. In fact, by virtue of the much smaller central section of the bottom in relation to the dynamic waterline length and by virtue of the presence of the two rounded-sectioned longitudinal side portions, the formation of waves by the hull itself is opposed by the side portions which form a counter-wave, with the direct result that the critical speed of the hull according to the invention is freed from the dynamic wave phenomenon.

Another important advantage concerns the fact that a hull according to the invention makes little leeway. In fact, the side walls of the U-shaped keel act as particularly effective vertical stabilisers even at large heeling angles.

Preferably, adjacent the stern, the longitudinal side portions of the bottom have downwardly diverging appendages with supporting feet, each appendage being hinged at its rear to a rudder blade.

By virtue of this further characteristic, it is not necessary to use expensive launching cradles when the hull is taken out of the water, since the hull rests firmly on the keel and on the diverging appendages.

BRIEF DESCRIPTION OF THE DRAWINGS

Further characteristics and advantages of a hull according to the invention will become clear from the detailed description which follows with reference to the appended drawings, provided by way of non-limiting example, in which:

FIG. 1 is a perspective view of a hull according to the invention,

DETAILED DESCRIPTION OF THE INVENTION

With reference to the drawings, a sailing-boat hull is generally indicated 10 and has a bottom or quickwork C, sides F, a bow P, and a flat transom S.

The bottom C is provided with a keel 12 having a U-shaped cross-section which is connected at 12a and 12b respectively to the bow P and to a zone $S_1$ adjacent the transom S. Beside the keel 12, the bottom C has two longitudinal channels 14 of rounded section which extend from the transom S for approximately two thirds of the length of the hull 10 and then become rounded steps 14a connected to the bow P and laterally to the sides F of the hull.

Figure 3:
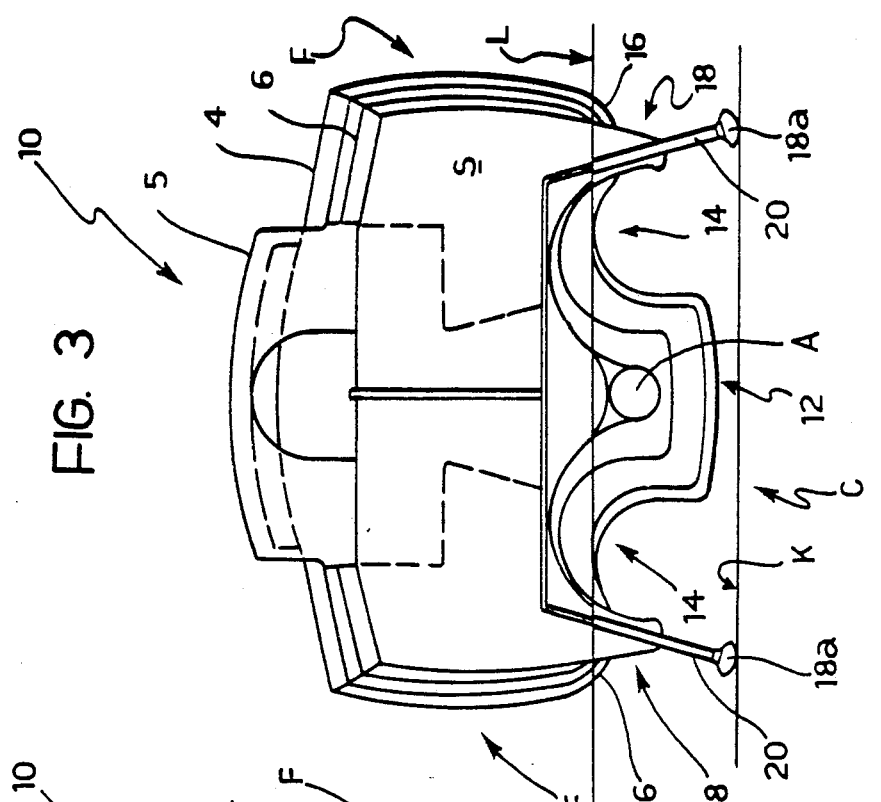
FIG. 3 is a view taken on the arrow III of FIG. 1, showing the cross-sections indicated 6, 5 and 4.
Figure 2:
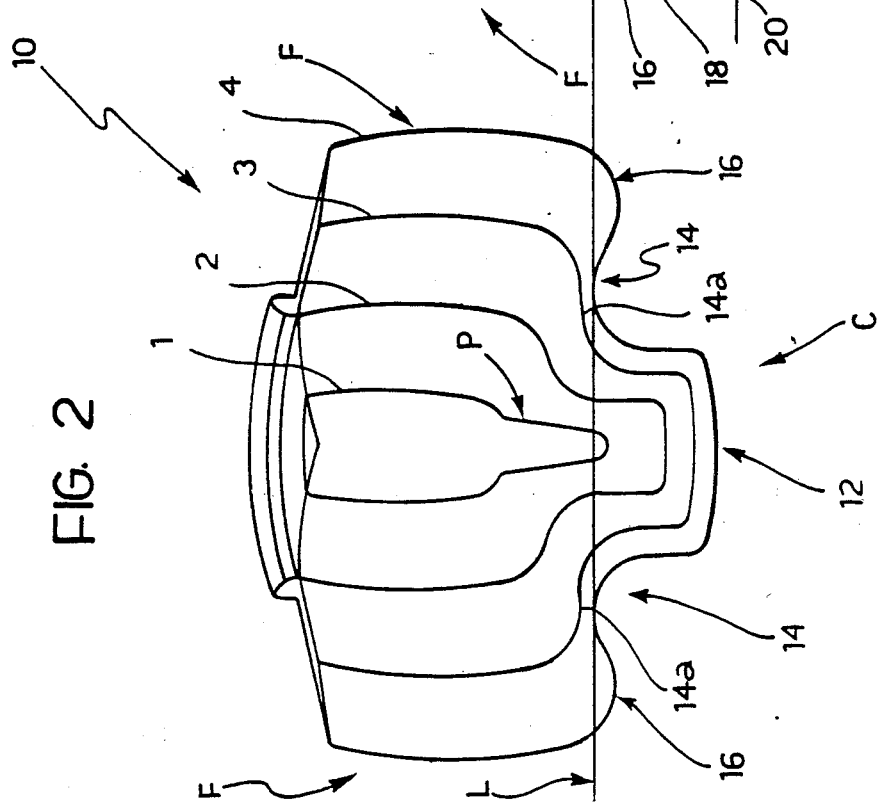
FIG. 2 is a view taken on the arrow II of FIG. 1, showing the cross-sections indicated 1, 2, 3 and 4.

Two longitudinal side portions 16 of the bottom are defined between the longitudinal channels 14 and the sides F of the hull and are situated at a higher level than the keel 12. The side portions 16 have substantially rounded sections and extend from the stern for approximately two thirds of the length of the boat to converge with the bow steps 14a. The shape of the keel 12, the longitudinal channels 14 and the side portions 16 is clearly defined by the cross-sections of FIGS. 2 and 3, in which the waterline of the hull 10 is indicated L.

Near the stern, the side portions 16 have flat diverging appendages 18 provided with lower support portions 18a. A rudder blade 20 is articulated to each of the appendages 18 and projects axially from the transom S. It is clear that, when the boat is taken out of the water, the hull 10 does not require any launching cradle since it rests directly on the ground, indicated K in FIG. 3, in correspondence with the keel 12 and the portions 18a of the two diverging appendages 18.

The boat provided with the hull 10 can be provided with an inboard/outboard engine, whose propeller emerges at A in correspondence with the transom S.

When the boat is under way, the vertical stabilisers which resist the leeway are essentially the lateral vertical surfaces of the keel 12, whilst the bottom surface of the keel 12 contributes, particularly at planing speeds, to the progressive raising of the lateral portions 16 to the surface L, thus enabling considerable speeds to be achieved.

Figure 4:
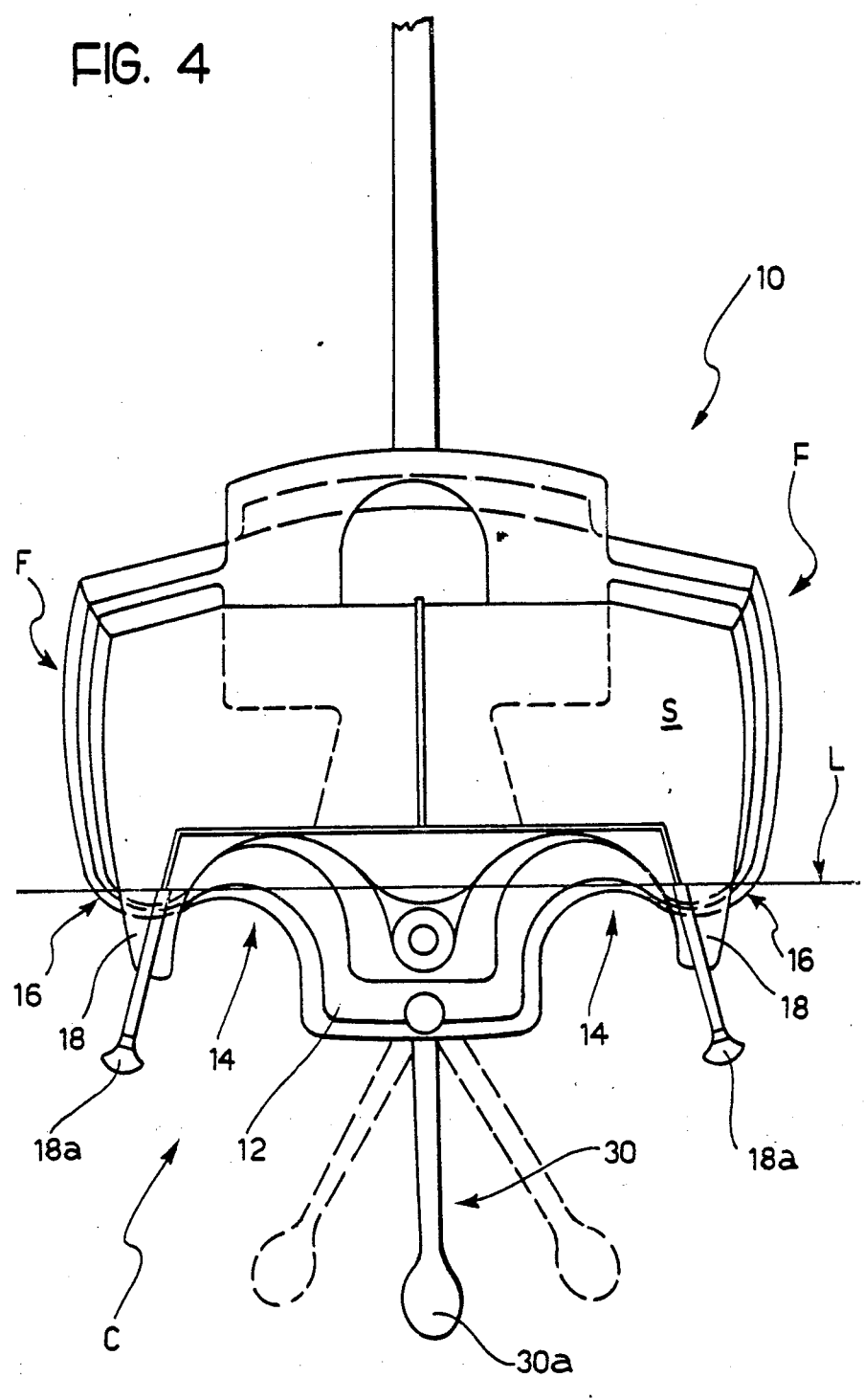
FIG. 4 is a view similar to FIG. 3 and relates to a hull provided with a swinging centreboard.

In order to further reduce the leeway when sailing closehauled or across the wind, the hull 10 may be provided with a centreboard 30 (FIG. 4) with a shaped ballast 30a. To advantage, the centreboard 30 may be of the type which can be inclined laterally by means of a hydraulic actuator operated (in known manner) by a boom.

The particular shape of the bottom C enables a seat (not illustrated) to be formed in correspondence with the longitudinal channels 14 for housing a flexible ring-shaped inflatable envelope which, in its inflated configuration, ensures the buoyancy of the boat if the hull is flooded.

I claim:

1. A sailing-boat hull, characterized in that it has a bottom (C) which is provided with a projecting keel (12) having a substantially U-shaped cross-section extending substantially the entire length of the hull with tapered ends (12b, 12a) connected to the stern region ($S_1$) and to the bow region (P) of the hull (10) respectively, and which is connected to opposite sides (F) by means of two longitudinal channels (14) of rounded section connected to the keel (12) and extending from the stern region for approximately two-thirds the length of the hull before becoming rounded steps in the bow region (P) so as to define two longitudinal side portions (16) of the bottom (C), which have rounded sections and which are situated at a higher level than the keel (12) and extend from the stern (S) for a substantial length of the bottom (C).

2. A hull according to claim 1, characterised in that, adjacent the stern (5), the longitudinal side portions (16) of the bottom (C) have downwardly diverging appendages (18) with supporting feet (18a), a rudder blade (20) being hinged to the rear of each appendage (18).

* * * * *